Patented Nov. 12, 1940

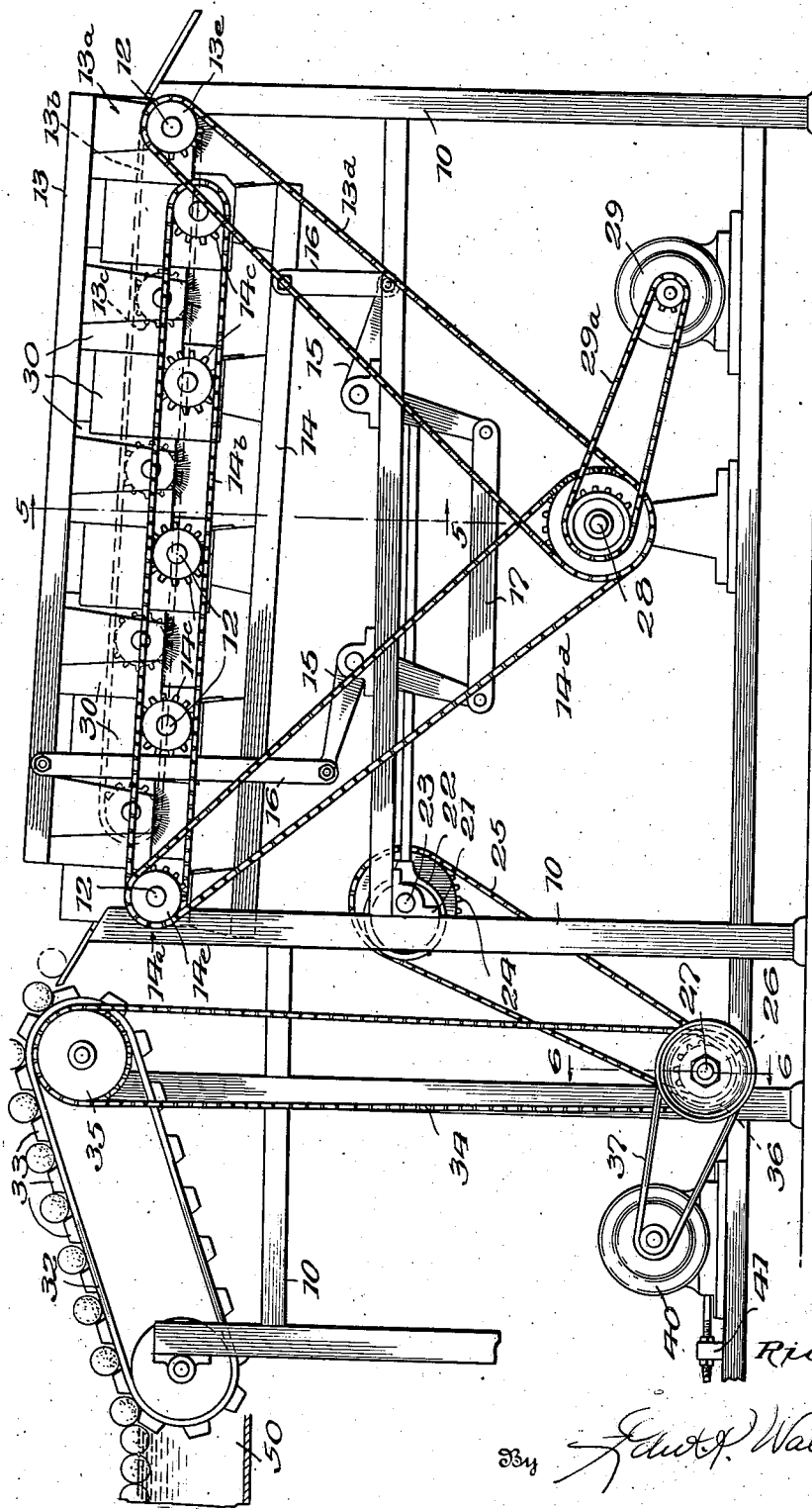

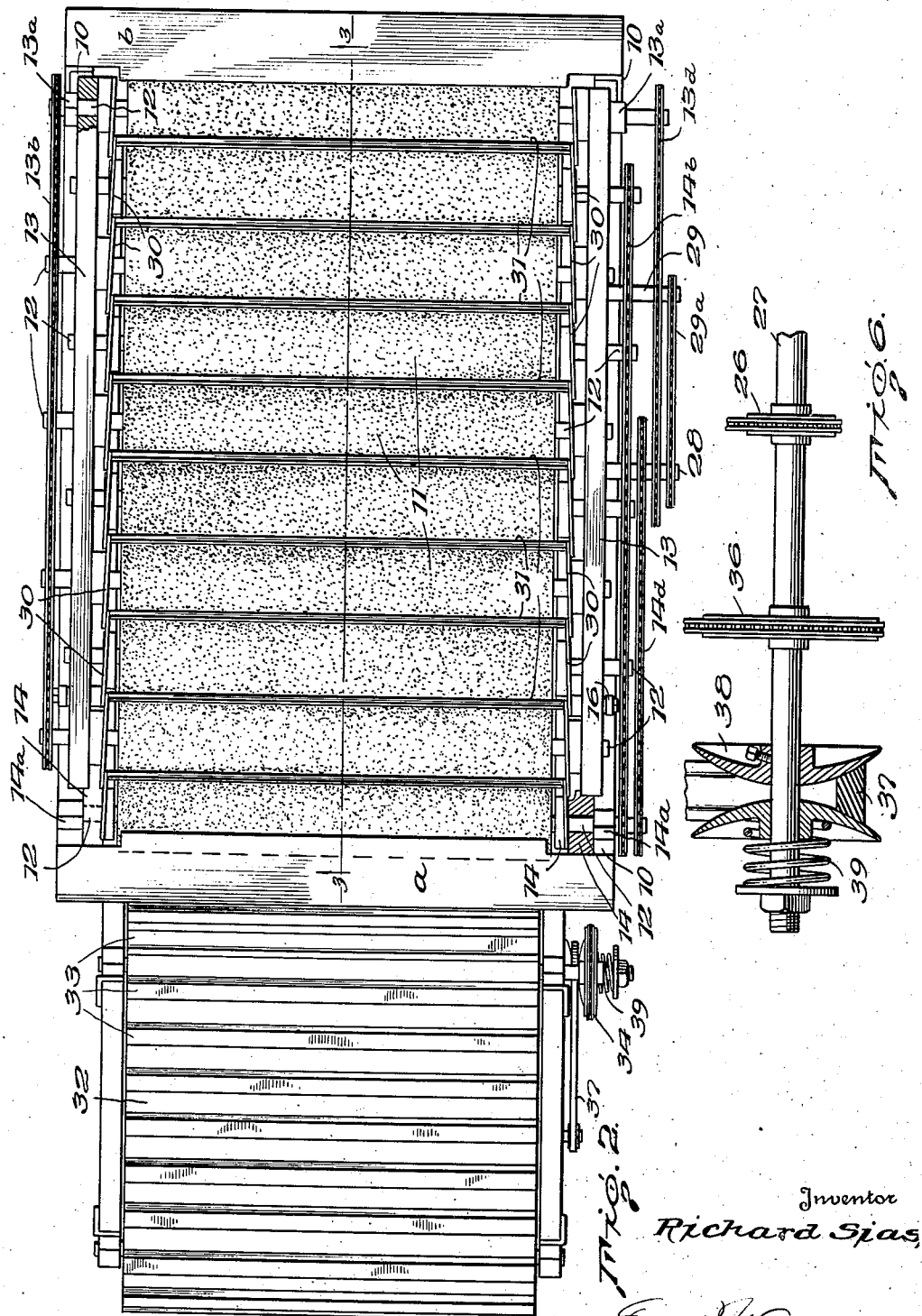

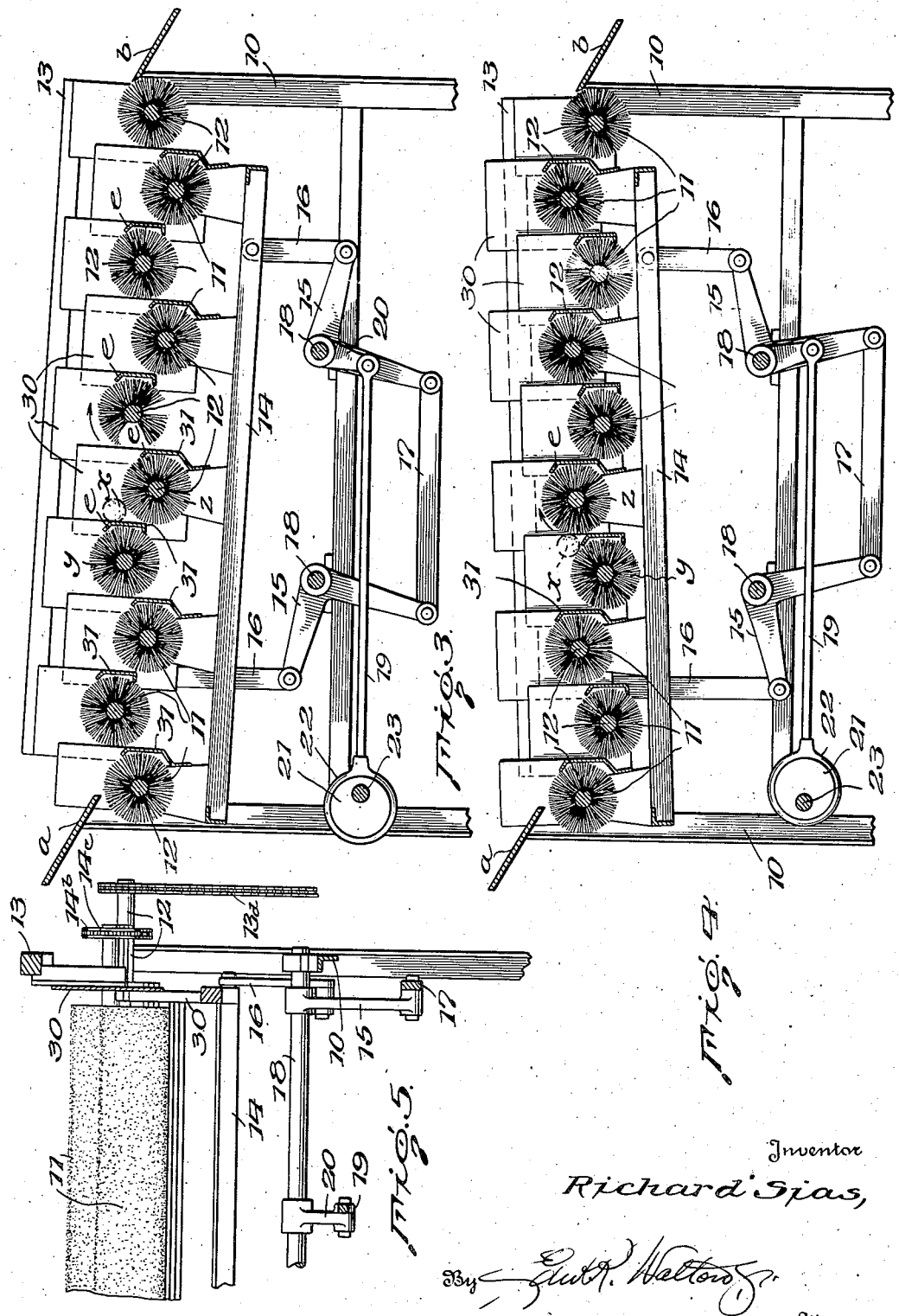

2,221,682

UNITED STATES PATENT OFFICE 2,221,682

APPARATUS FOR TREATING FRUIT

Richard Sias, Orlando, Fla., assignor to American Machinery Corporation, Orlando, Fla., a corporation of Florida Application December 31, 1937, Serial No. 182,908

9 Claims. (Cl. 146—202)

The present invention is an apparatus for treating rollable articles and more particularly applicable to the processing of fresh fruits for the market such as washing, polishing or drying fruit during processing treatments.

The present invention is an improvement upon the apparatus disclosed in the copending application of Charles H. Vreeland, Ser. No. 154,301, filed July 17, 1937, which became Patent No. 2,179,459 on November 7, 1939, and the apparatus disclosed in the patent to Harry J. Brandenburg, No. 2,035,587.

In machines for processing fruit which employ substantially parallel cylindrical members, such as brushes or rollers, forming a continuous surface for the conveyance of fruit and in which adjacent rotary brushes have relative reciprocable movement above and below the plane of adjacent brushes to advance the fruit, it is found that such members of a given diameter will not satisfactorily treat all sizes of fruit and advance the same satisfactorily along the conveyor. Consequently, even with brushes of standardized size (that is, about 5 inches in diameter) fruit of not more than 3 inches in diameter will not always be advanced through the machine by the rotation and reciprocation of the brushes, but will remain in the troughs or valleys between the rollers. If smaller or larger size brushes are used with fruit of varying size the same condition will prevail with certain sized fruit or the treating operation (which is the purpose of the brushes or rollers) will not be as effective on certain size fruit as upon others.

The present invention, therefore, aims to overcome the above stated drawbacks or disadvantages by providing for the treatment of fruit by brushes irrespective to its size or diameter and providing for the steady advancement or feeding of the fruit along the conveyor irrespective of its size or diameter by the rotation and reciprocable movements of the brushes independently of any urge of fruit being fed over the brushes or being fed onto the brushes.

In the present invention the above object is accomplished by stopping, momentarily, the rotation of the fruit caused by the rotation of the brushes while in a groove or valley at a time during the reciprocation of the brushes when it is desirable to advance the fruit to the next groove or valley. With 5 inch brushes, satisfactory results have been obtained with fruit of varying size and the brushes rotating about 200 revolutions per minute. But, of course, the speed of the brushes may be varied according to the size of any particular batch of fruit that may be introduced upon the brushes.

The reciprocable movement of the brushes or rollers is not merely for the advancement of fruit along the conveyor, but, in addition thereto, provides for the better treatment of the fruit (whether it is brushing, drying or polishing) due to the fact that the reciprocating movement of the cylindrical members tends to keep the fruit from spinning on one axis and insures that the entire surface of the fruit or article will be subjected to the action of the brushes or rollers within the length of the machine; and, also, insures against the fruit becoming bruised due to bumping of the fruit together or crowding over the rollers of the fruit as the reciprocation of the brushes or rollers eliminate this condition.

The present objects may be carried out, as for example, by the apparatus herein shown and described wherein there is a plurality of cylindrical rotatable brushes in juxtaposition forming a substantially horizontal conveying surface with troughs or valleys between each brush and adjacent brushes having relative movement with respect to each other transversely of their axes of rotation or such movement as to alternately dispose the upper peripheral portions above and below the plane of adjacent brushes, and means for stopping the rotation or spinning of the fruit, preferably, on the back or rear brushes of each trough or valley (i. e. rear with respect to the direction of travel of fruit through the machine) in such a manner that this stopping means is brought into contact with the fruit after said rear brush has been moved for the desired distance above the next adjacent forward brush whereby the latter, with which the fruit is in frictional contact, will draw the fruit into the next succeeding groove or valley.

The apparatus, further, provides for the positive reciprocation of adjacent brushes in opposite directions, producing relative reciprocating movement to the brushes, in such a manner that the movement of one set of brushes in one direction counterbalances the movement of the other set of brushes in the opposite direction, thereby requiring a minimum of power to reciprocate the brushes, and only sufficient to overcome friction between the parts.

With the above and other objects in view, the invention resides in whatever is shown and described and pointed out in the appended claims.

In the drawings which disclose one embodiment of means for performing the result and which means illustrates the preferred embodiment that has been so far devised:

Figure 1 is a side elevation of the apparatus of this invention;

Figure 2 is a top plan view of Figure 1;

Figure 3 is a longitudinal sectional view taken substantially on line 3—3 of Figure 2 and showing the brushes in one of their positions;

Figure 4 is a view similar to Figure 3 and showing the brushes in another of their positions;

Figure 5 is a fragmentary transverse sectional view taken substantially on line 5—5 of Figure 1; and Figure 6 is a fragmentary transverse sectional view taken substantially on line 6—6 of Figure 1 and illustrating a variable pulley, whereby the speed of brush reciprocation and the delivery feed may be regulated.

Referring more specifically to the drawings, in which like characters denote similar and like parts throughout the several views, the machine may comprise a supporting frame 10 of any suitable construction or design having mounted thereon, preferably in a substantially horizontal plane, a plurality of rotatable elements 11 arranged in substantially close parallel relation in order to provide a support or surface over which the fruit being treated may pass. The elements 11 may be, and preferably are, but not necessarily, of the cylindrical type and each suitably journaled, as at 12, whereby they may be rotated by any convenient or appropriate means, it being preferred, though not necessary, that the elements be of the same size and rotate at the same speed. The elements 11 may be brushes, as shown, which are employed in washing, cleansing, applicating or polishing, or they may be rollers used for many other purposes, one of which is drying in a manner well known in the art. Consequently, when either "brushes" or "rollers" are herein referred to, for convenience, they are intended to mean either brushes or rollers.

Broadly, in accordance with this invention, two or more adjacent brushes 11, have a relative movement, whereby the surfaces thereof, over which the fruit passes, are alternately above and below each other. This function or operation may be accomplished in different ways; one example being shown in the drawings, where two hanger-frames 13 and 14 have alternate brushes mounted on or carried thereby and operable to move the brushes thereon out of the plane of the axes of the brushes of the other frame. These hanger-frames 13 and 14 are, preferably, but not necessarily, arranged one above the other with brushes carried thereby lying in substantially parallel side-by-side juxtarelation for the purpose above mentioned, there being, of course, as many brushes or rollers 11 as may be necessary or desirable to properly perform the operation, such as washing, cleansing, drying or polishing.

The hanger-frames 13 and 14 are each pivoted at one of their ends, only, to opposite ends, respectively, of the main frame 10 as at 13a and 14a, which pivots are preferably in the same horizontal plane, or substantially so; and this may be readily accomplished by journalling in the frame 10 the ends of the shafts 12 of the end brushes 11 adjacent the pivots 13a and 14a. The other ends of the hanger-frames 13 and 14 are connected through a linkage in a manner that the weight of one will counterbalance the other, this linkage being connected to an actuating means whereby the hanger-frames are reciprocated, one with respect to the other; and it is preferred that this linkage be such that the hanger-frames will remain substantially parallel but at varying distances from each other during their operation.

To this end, two pivoted bell crank levers 15 are mounted on the main frame 10, preferably under the hanger-frames, at suitably spaced distances, one end of each bell crank lever is connected, respectively, by link 16 to the distal end of its hanger-frames. The other ends of the bell crank levers are connected together by a rigid equalizing link 17. When any part of the linkage is moved, one of the hanger-frames will be moved in one direction about its pivot and the other one will be moved in an opposite direction about its pivot. Of course, it is within the purview of the invention that the hanger-frames 13 and 14 slide with respect to each other rather than being mounted on the pivots 13a and 14a, but this would not affect the operation of the linkage 15, 16 and 17 in the manner just described. It is preferable that the links 16 assume a substantially vertical position, as shown in the drawings, to sustain the weight of the hanger-frames by end thrust thereon. Thus it will be seen that the weight of one hanger frame will balance the weight of the other (their weights being substantially the same) and, therefore, in normal position the brushes 11 will lie substantially in the same plane and a very slight amount of power will be necessary to move the frames, only sufficient being required to overcome the friction of the parts and the weight of the fruit or other articles on the brushes.

In the practical embodiment of the machine, the linkage 15, 16 and 17 is duplicated, one set disposed on each side of the frame 10 and connected to opposite sides of the hanger frames, and the pivots upon which the bell crank levers 15 are mounted take the form of transverse rods or shafts 18 to which the levers may be rigidly secured. The linkage 15, 16 and 17 is actuated to move the frames 13 and 14 by any suitable means, but is here shown as operated by a pitman rod 19 connected at one end with a crank lever 20 fast on one of the shafts 18 and at the other end to a cam or eccentric 21 by means of a cam strap or link 22 disposed about the periphery of the eccentric 21. The cam or eccentric 21 is fast on a shaft 23 which has a sprocket wheel 24 fast thereon over which is trained a sprocket chain 25 also in engagement with a sprocket wheel 26 fast on the pulley shaft 27 mounted on the frame 10. The degree of relative movement of the hanger frames 13 and 14 (and consequently of the brushes 11) will depend upon the size of the eccentric 21 or of the bell crank levers 15.

The brushes 11 of each frame are preferably rotated as a group or unit by sprocket chains, there being a sprocket chain 13b for the brushes carried by frame 13 and a sprocket chain 14b for the brushes carried by the hanger-frame 14. The sprocket chains are trained, respectively, over sprocket wheels 13c and 14c on the shafts 12 of the brushes in the respective hanger-frames 13 and 14. In order to avoid interference in the operation of the frames, the sprocket chains 13b and the sprocket wheels 13c are disposed on one side of the machine while the sprocket chain 14b and wheels 14c are on the other side. The chains 13b and 14b are operated, respectively, to rotate said brushes in the same direction by drive chains 13d and 14d trained over sprocket wheels 13e and 14e fast on the shafts of the end brushes, which shafts form the pivots 13a and 14a about which the frames 13 and 14, respectively, move. These drive chains 13d and 14d also pass over sprocket wheels on a shaft 28 journaled on the frame 10 and driven in any suitable manner from a motor or other source of power 29, such as by chain 29a.

In order to retain the fruit in the machine, while passing over the brushes and to prevent lateral displacement of the fruit during the operation of the machine, side walls are provided which preferably consist of a plurality of separate linearly arranged overlapping plates 30 on each side of the machine and at the ends of the brushes and preferably between the brush ends and the sprockets 13c and 14c carried thereon. Alternate plates are secured to upper and lower hanger frames 13 and 14, the plates being of such height or size as to form a continuous side wall at all times.

It must be seen that with fruit introduced into the machine at a with the machine in operation, it will move in the valley between the first two rollers substantially in the same manner as in the Vreeland application and the Brandenburg patent above referred to. In order to insure the passage of fruit of varying size from one valley to the next succeeding valley between adjacent brushes, it has been found, as above stated, that this may be accomplished by the provision of guard piece 31 (or what is termed a "brake") on the back or near side of each brush (that is, rear with respect to the direction of movement of fruit through the machine) so as to lie between adjacent brushes.

These guard pieces or brakes 31 are substantially coextensive with the brushes and are held in position by being suitably secured to some stationary part of the hanger-frame by which its brush is carried. This guard plate or brake need have only a width, in a direction of the circumference of its respective brush, sufficient that when the brush is in its uppermost position the guard plate will contact the fruit lying between it and the next succeeding brush to separate it from the preceding brush carrying the guard plate, whereby said succeeding brush, being in the lower position, will advance the fruit thereover into the next succeeding groove or valley.

The position of the guards 31, as shown in the drawings, is substantially that used in practice and the guards terminate at a distance below the effective upper peripheral surface portion of the brushes and have their upper edges e slightly inclined toward the brush to remove any obstruction to the fruit or abrasive sharp edges. When a given brush is in its lowermost position, say brush y, as shown in Figures 3 and 4, the guard or brake 31 will not extend into the groove or valley formed between said brush and the next succeeding adjacent brush z, as clearly indicated in Figure 4, so that the fruit x may be rotated or spun by the brushes forming the valley to give the desired treatment to the fruit. As the frames 13 and 14 are moved relative to each other and the lowermost brush y is raised and the uppermost next succeeding brush z is lowered, this treating operation of the brushes on the fruit x in the valley will continue until their upper peripheral portions have passed beyond a common horizontal plane (or, in other words, a plane in which all of the brushes lie) and where the pressure of the fruit on both brushes is substantially equal. As the brushes continue to move relative to each other, in the manner previously explained, and the brush y becomes elevated above the brush z, at which time the gravity component of the fruit against the brush z is continually increased, the guard or brake 31 may be so positioned to then interpose itself between the brush y and z. Since the guard or brake 31 is a non-rotating element, it has been found that it will effectually cause the roller z (which then is in its lowermost position as shown in Fig. 3 where the gravity component thereon is at its maximum) to carry over fruit of varying sizes to the next succeeding valley.

While applicant does not wish to advance the theory of this operation, it appears from observations and practice that the rotation of the fruit is brought, momentarily, to a stop by the brake 31 and the inertia of the fruit, or its resistance to being again set in motion is greater than the pull of gravity tending to hold it in the trough or valley. Hence, the frictional contact between the fruit and the brush z, when in lowermost position, is sufficient to draw the fruit over into the next succeeding valley, provided proper speed of the rotation of the brushes is maintained, which has been found to be around 200 R. P. M. for brushes 5 inches in diameter. Of course, this speed may be varied to obtain the best results with various batches of fruit which may include fruit with different diameters. The speed of rotation of the brushes may be varied by a suitable control of the motor 29.

The operation just defined is repeated until the fruit has reached the discharge end b of the machine, where it passes into suitable containers or upon suitable conveyors. The relative movement of the brushes produced by the movement of the frames 13 and 14 changes the axis of rotation of the fruit many times as the gravity component of the fruit is constantly shifted, thus insuring complete treating of the fruit over its entire surface by the brushes.

The relative movement of the brushes, due to the movement of the frames 13 and 14, prevent the fruit from being fed in at a from crowding through the machine, from one groove or valley between adjacent rollers to another, before the next succeeding valley (and to which fruit to be moved) is cleared of fruit, thus avoiding bumping contact or crowding which would injure the fruit. Furthermore, it will be seen that this relative movement of the brushes definitely insures positive feeding of the fruit through the machine and is not dependent upon the crowding or urge of incoming fruit thereagainst for its conveyance from one valley to another as the brushes definitely eliminate this condition. The elimination of this condition is further insured by the provision of a feeding conveyor 32 mounted on the frame 10 supported in any other suitable manner and which has flights 33 thereon. The space between the flights is of orange depth or, in other words, sufficient to contain only one row of oranges.

In practice this conveyor 32 may receive the oranges from a soaking tank 50 into which one end of the conveyor extends, as shown in the drawings, or may receive them from any other suitable conveyor. The conveyor 32 is driven by a belt or sprocket chain 34 passing over a sprocket wheel 35 on the shaft of one of its feeding rollers and over the sprocket wheel 36 on the pulley shaft 27 so that the conveyor will be synchronously operated with respect to the relative movements of the frames 13 and 14 in order that only one row of oranges or other articles will be delivered to the valley between the first pair of rollers 11 during one cycle of relatively reciprocating movement between said rollers, thus insuring that the valley between the first pair of rollers 11 will be cleared of fruit before additional fruit is fed thereto.

The pulley shaft 27 is driven from a suitable motor or other source of power 40 by belt 37 passing over a variable speed pulley 38. This variable speed pulley is of conventional type consisting of split halves, one secured to the shaft 27 and the other yieldingly held in position by a compression spring 39. Thus, by slightly shifting the motor 40 on its base by means of an adjustable means 41, the speed of the shaft 27 may be varied, consequently varying the speed operation of the frames 13 and 14 and the conveyor 32. Any other speed varying means, however, may be used in lieu of the one shown and described.

Having thus described the apparatus of the present invention in detail and the manner in which the same is to be performed, it is to be understood that the invention is not to be limited to the exact details of description and disclosure of the drawings herein because the same may be modified and varied in numerous ways within the scope of the present invention.

That which is claimed is:

1. In a brush machine, a plurality of rotatable cylindrical brushes arranged in relatively close relation to form a substantially horizontal surface over which may pass articles to be acted on by the brushes, adjacent brushes having a relative movement with respect to each other transversely of their axes of rotation to alternately dispose the upper peripheral portion of adjacent brushes out of alignment with each other during the operation of the machine, and a brake member disposed on the rear side of each brush with respect to the travel of the articles through the machine and movable with the said relatively transverse movement of the brush and positioned to be engaged by the article in the valley between said brush and the next succeeding adjacent brush when the upper peripheral portion of said next succeeding adjacent brush is in a determined position below the upper peripheral portion of the adjacent preceding brush and to separate the article from contact with the latter.

2. In a machine of the character described comprising a plurality of rotatable cylindrical brushes arranged to form a substantially horizontal surface over which may pass articles to be treated, means for rotating the brushes in the same direction and in the direction of the travel of the articles over the brushes, a pair of movable hanger-frames by which alternate brushes are respectively supported, and means for actuating said movable hanger frames to move adjacent brushes substantially vertically in opposite directions for a predetermined distance transversely of the axes of said brushes and to alternately dispose the upper peripheral portions of the adjacent brushes out of alignment with each other during operation of the machine, said brushes being arranged sufficiently close to each other to prevent at all times the articles being brushed from being discharged between adjacent brushes.

3. In a machine of the character described; a main frame; a pair of hanger-frames each pivoted at one of its ends to opposite end portions of the main frame, respectively; a plurality of rotatable cylindrical brushes arranged to form a surface over which may pass articles to be treated, said hanger-frames each supporting alternate brushes in position, means for rotating the brushes in the same direction to effect the travel of the fruit through the machine; and means connected with said hanger-frames to oscillate the same in opposite directions whereby the upper peripheral portions of the brushes are moved into and out of alignment with each other, during operation of the machine, said brushes being arranged sufficiently close to each other to prevent at all times the articles being brushed from being discharged between adjacent brushes.

4. In a machine of the character described as set forth in claim 2 further characterized by the hanger-frame actuating means including a linkage connection between said frames for counter balancing the weight of one frame and its appurtenances with the weight of the other frame and its appurtenances, and means for operating said linkage.

5. A machine of the character described as set forth in claim 2 further characterized by the hanger-frame actuating means including a bell crank lever for each frame, each having one arm thereof connected with one of said frames, respectively, and the other of said arms of said bell crank levers being connected by an equalizing bar, and means for operating said bell crank levers.

6. In a machine of the character described as set forth in claim 2 further characterized by said hanger-frames being disposed one above the other; and the actuating means for said hanger-frames including a bell crank lever for each frame, an equalizing bar connecting an arm of each of said bell crank levers, and a link between the other arm of each of said bell crank levers and one of said frames, respectively, to maintain said frames substantially parallel but at varying distances from each other.

7. In a brushing machine, two sets of brushes, each set of brushes comprising substantially cylindrical rotatable brushes, the brushes of one set alternating with the brushes of the other set to form a bed extending in a substantially horizontal direction and over which may pass articles to be acted on by the brushes, the brushes being arranged in substantially close relation so that at all times during their operation the articles being treated will not be discharged from the machine between adjacent brushes, means for rotating the brushes in the same direction for effecting the travel of the fruit through the machine transversely of the brushes, means for causing relative substantially vertical movement of said two sets of brushes to bring the upper bed forming surface of adjacent brushes alternately above and below each other, and means in each valley between adjacent brushes and arranged to be exposed for contact with the articles being treated, when the brush to the rear of the article and the brush forward of the article, with respect to the direction of travel of the articles, are relatively moved upwardly and downwardly respectively a predetermined distance to break or retard the spinning action of the articles imparted by the brushes, whereby the fruit is drawn over the said forward brush by its tractional contact with the last mentioned brush.

8. In a brushing machine as set forth in claim 7 further characterized by each of said braking means between adjacent brushes comprising a non-rotating member carried by each of said brushes at the discharge side thereof with respect to the travel through the machine of the articles being treated, said member extending substantially the length of said brush and whose upper edge terminates below the upper peripheral bed forming portion of its brush.

9. In a brushing machine, a plurality of rotatable brushes forming a substantially horizontal bed over which pass articles to be acted upon by the brushes, means for rotating said brushes in the same direction for effecting the passage of the fruit through the machine, means for causing adjacent brushes to be moved alternately out of alignment and braking means in the valleys between said brushes and carried on the discharge side of each brush to engage the articles in the valleys when said brush is moved out of alignment a predetermined distance above the succeeding adjacent brush, whereby the fruit is drawn over said preceding brush by its tractional contact with said last mentioned brush.

RICHARD SIAS.